United States Patent [19]

Kagami et al.

[11] Patent Number: 5,237,496
[45] Date of Patent: Aug. 17, 1993

[54] INVENTORY CONTROL METHOD AND SYSTEM

[75] Inventors: Akira Kagami, Kawasaki; Koichi Homma, Yokohama; Kichizo Akashi, Ebina; Takayuki Aizawa, Matsudo; Hiroshi Mori, Ebina, all of Japan

[73] Assignee: Hitachi, Ltd., Tokyo, Japan

[21] Appl. No.: 856,540

[22] Filed: Mar. 24, 1992

Related U.S. Application Data

[63] Continuation of Ser. No. 442,055, Nov. 28, 1989, Pat. No. 5,128,861.

[30] Foreign Application Priority Data

Dec. 7, 1988 [JP] Japan .................. 63-307825

[51] Int. Cl.⁵ .............. G06F 15/22; G06F 15/24; G06G 7/52
[52] U.S. Cl. ................................... 364/401
[58] Field of Search ................ 364/403, 401; 283/55

[56] References Cited

U.S. PATENT DOCUMENTS

| | | |
|---|---|---|
| 4,646,238 | 2/1987 | Carlson, Jr. et al. ............ 364/403 |
| 4,737,910 | 4/1988 | Kimbrow ....................... 364/403 |
| 4,783,740 | 11/1988 | Ishizawa et al. ................ 364/403 |
| 4,887,207 | 12/1989 | Natarajan ...................... 364/401 |
| 4,972,318 | 11/1990 | Brown et al. ................... 364/403 |
| 5,128,861 | 7/1992 | Kagami et al. .................. 364/401 |

OTHER PUBLICATIONS

"American Software Inventory Planning System" Data Resources Directory, p. J439 (Datapro Directory of Software p. D84-100-003, 1973).
American Software Inventory Department, American Software, Inc., Data Sources Directory, p. J 439, 1984.
"DTRO Forecasting System", DTRO Software, Datapro Directory of Software, p. D85-100-013, 1976.
Daisuke Miura, "Control Techniques for Information Processing by Engineers—5-3 Inventory Control Syste", pp. 243,251.

Primary Examiner—Gail O. Hayes
Assistant Examiner—Laura Brutman
Attorney, Agent, or Firm—Fay, Sharpe, Beall, Fagan, Minnich & McKee

[57] ABSTRACT

In an inventory control method and system, changes of sales for individual goods are forecasted and the excess or deficiency of a stock of each of the goods at the present point of time is estimated from the results of forecast. In order to facilitate an inventory control, merchandise information is sorted and displayed in accordance with the degree of urgency, the degree of importance or the like of inventory adjustment on the basis of the results of estimation.

6 Claims, 9 Drawing Sheets

| t |  | JUNE 20 |  | JULY 27 | JULY 28 |  |
|---|---|---|---|---|---|---|
| x |  | 0% |  | 15% | 17% |  |

35

PERIOD OF INTRODUCTION

CLASS (1)

| NAME OF GOODS | SHARE (%) |
|---|---|
| A | 30 |
| B | 25 |
|  |  |

| RANKING | NAME OF GOODS | γ | Δt | CONTRACT, ETC. |
|---|---|---|---|---|
| 1 | X X X X | 23% | 18DAYS | ADDITIONAL ORDER OF 31 PIECES IS POSSIBLE |
| 2 | △ △ △ △ | 41% | 12DAYS | 14 PIECES ARE ON ORDER |
| 3 | ○ ○ ○ ○ | 55% | 26DAYS | ××STORE SEEMS TO BE IN OVERSTOCK |
| | | | | |

FIG. 13

| RANKING | NAME OF GOODS | SALES AMOUNT | STOCK | γ | Δt |
|---|---|---|---|---|---|
| 1 | X X X X | 148 PIECES | 43 PIECES | 26% | 8DAYS |
| 2 | △ △ △ △ | 102 PIECES | 82 PIECES | 104% | —DAYS |
| 3 | ○ ○ ○ ○ | 78 PIECES | 36 PIECES | 38% | 14DAYS |
| | | | | | |

FIG. 14

| NO. | NAME OF GOODS | CONTRACT NUMBER OF GOODS | DATE OF ATTAINMENT | PLANNED PERIOD OF SALE |
|---|---|---|---|---|
| | | | | |

INVENTORY CONTROL METHOD AND SYSTEM

This application is a continuation application of U.S. Ser. No. 07/442,055, filed Nov. 28, 1989, now U.S. Pat. No. 5,128,861.

BACKGROUND OF THE INVENTION

The present invention relates to an inventory (or stock) control method and system in a merchandise information processing system used in a retail industry such as a department store, and more particularly to a stock-warning method and system suitable for support of inventory control operations (or works) for goods or merchandises such as fashion goods which have a large change of sales.

The conventional inventory control operation supporting method is disclosed by Daisuke Miura, "CONTROL TECHNIQUES FOR INFORMATION PROCESSING ENGINEERS - 5.3 INVENTORY CONTROL SYSTEM", pp. 243 to 251. This article discloses a variety of inventory control methods of determining the ordering point (or date) of goods and the ordering quantity of goods so as to minimize the total of costs related to a stock of goods. For example, there are disclosed an ordering point method and a periodic ordering method which will be described hereinbelow.

(1) Ordering Point Method

The ordering point method is a method in which a stock of goods is always (or contineously) monitored and a fixed quantity $Q_0$ of goods are ordered when a stock level falls below a fixed value K. K is called an ordering point (or reorder level) and $Q_0$ is called an economic ordering quantity.

In this method, the ordering quantity is always constant though the order is made irregularly. A great problem is that the stock level must be contineously monitored.

(2) Periodic Ordering Method

The periodic ordering method is a method in which the optimum ordering quantity Q is estimated at every fixed interval (or cycle) n and the estimated quantity of goods are ordered. The interval n is selected to be an economic ordering interval.

This method is mainly employed for the following reasons:

(a) It is difficult to contineously monitor the stock level.

(b) A stable stock level required in a target period for a sale plan is not attainable.

(c) It is not possible in view of practical affairs to give an order at an arbitrary day.

(d) Goods may have a change of the specification thereof and hence the settlement cannot be made with only a predetermined ordering procedure.

A task in the ordering point method is to determine a proper ordering point. A task in the periodic ordering method is to accurately estimate the ordering quantity. Generally, the ordering point method handles goods for which a stock level required is stable, the quantity of a stock can be grasped at a look and only the order of the same quantity is required every time. The periodic ordering method is mainly used for large-sized goods which are of high cost and have a relatively longer lead time (or time for execution of order).

SUMMARY OF THE INVENTION

An object of the present invention is to provide a method of and a system for issuing a warning against the excess or deficiency of a stock of goods.

Another object of the present invention is to provide a method of and a system for issuing a warning against the excess or deficiency of a stock of goods in accordance with the degree of seriousness which may be caused by the excess or deficiency.

The other objects of the present invention will become apparent from the disclosure in the present specification and the accompanying drawings.

A preferable object to which the present invention is applied is goods which have a relatively shorter life cycle and a large change of sales, for example, fashion goods (such as clothes in fashion). Goods such as fashion goods involve a high-degree problem on forecast for sales since it cannot be said that goods which are in good sale today will be lasted in good sale even after several weeks. Also, since an additional supply or order is not possible in many cases, it is not practical to employ a method in which the additional order is repeated simply and without any restriction.

In the case of fashion goods, the fulfillment or control of a contract quantity preliminarily entered into an agreement with a maker or wholesaler is important and an earlier judgement of the excess or deficiency of a stock should be made. Namely, in the case of the presence of a possibility of excess of the goods, it is necessary to make a proper disposal (reduction in price, transfer between stores, or return) and to introduce another goods. On the other hand, in the case of the presence of a possibility of deficiency of the goods, it is necessary to make the insurance of additional goods (additional order, or procurement or development of a substitute) and to determine the quantity of additional goods required. Also, the following problems exist. Namely, in the ordering point method requiring a safety allowance or stock level, it is not possible to determine the quantity of a stock definitely and fixedly since the sales of fashion goods are not constant. In the case of fashion goods in good well, a periodic reorder as in the periodic ordering method is not almost useful since it is important to get a maker or wholesaler to transfer the stock therein as many as possible to its own store.

As apparent from the foregoing, it is inconvenient to apply the conventional inventory control methods to fashion goods which are staple goods (principal commodities) handled by a department store or the like. Also, the final decision making in a contract control is left to a person in charge of order and sale in many cases since the contract control gives a large influence on a relationship in reliance with a maker or wholesaler. However, massive information must be utilized for make the final decision and hence a random processing yields a high danger of losing a change of countermeasures.

The above problems can be solved by the present invention as follows.

In one aspect of the present invention, changes of sales are forecasted for individual goods, an index suggestive of the excess or deficiency of a stock for each of the goods at the present point of time is determined from the results of forecast, and merchandise information on a plurality of goods is sorted and displayed on the basis of those indexes.

In another aspect of the present invention, prior to a processing of displaying merchandise information, the adequacy of display of the merchandise information is judged from the contents of a contract with a maker or wholesaler and/or the list of actions taken actually for inventory adjustment to control the amount and contents of information to be displayed.

By forecasting the change of sales for each of the goods, it becomes possible to give an estimation to the quantity of a stock at the present point of time in anticipation of a change of sales thereof. Namely, the excess or deficiency of the stock at the present point of time can be quantitatively estimated from the expected value of future sales which is determined by the forecast for the change of sales. If the quantitatively represented excess or deficiency of the quantity of stock is used as an index, it is possible to sort the merchandise information on respective goods in accordance with the degrees of excess or deficiency of stocks for those goods. In a large-scale retail store such as a department store, a person in charge of order and sale controls a large number of goods. Therefore, a thoughtless control enhances a danger of overlooking goods for which the inventory adjustment is actually required and losing a timing when an action for inventory adjustment (or a countermeasure) is to be taken. However, if the merchandise information is sorted in order of the degree of urgency or importance of inventory adjustment by virtue of the above-mentioned indexes, it is possible to assist the person in charge so as to make in a short time a decision on an countermeasure which is helpful for the improvement of the efficiency of inventory analysis and the improvements of sales and profits.

By judging the adequacy of display of merchandise information (or issuance of a warning) on the basis of the contents of the contract with the maker or wholesaler and/or the list of actions taken actually for inventory adjustment, it is possible not only to eliminate unnecessary information and/or to finely indicate or suggest the contents of an action to be taken for inventory adjustment but also to perform a control of the contract with the maker or wholesaler and/or a control of the list of actions for inventory adjustment.

DESCRIPTION OF THE PREFERRED EMBODIMENTS

An embodiment of the present invention will now be explained by use of the accompanying drawings.

Figure 1:
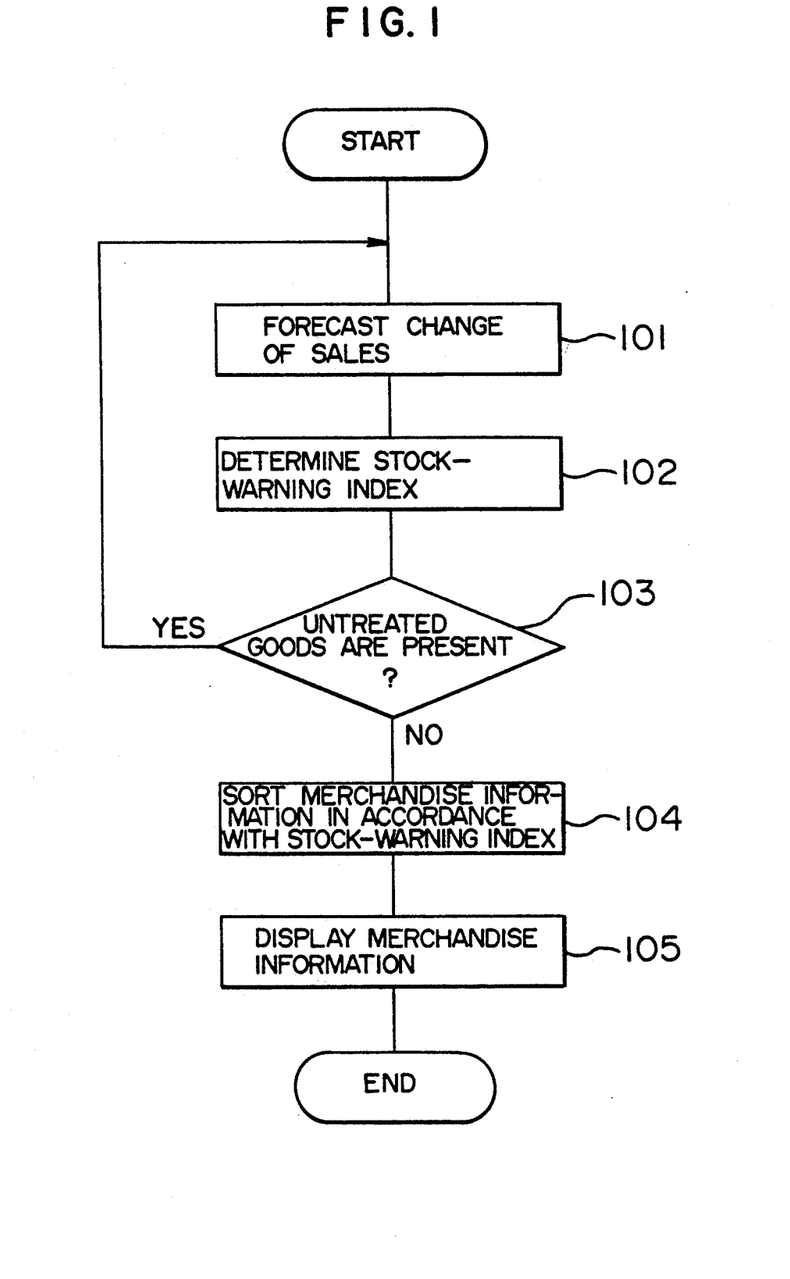
FIG. 1 is the flow chart of a processing performed in the present invention.

FIG. 1 is a flow chart showing a processing made in an embodiment of the present invention. First, changes of sales are individually forecasted (step 101) for all goods to be subjected to inventory control (step 103). An index representative of the excess or deficiency of a stock on hand (held by its own store) at the present point of time is determined on the basis of the results of forecast (step 102). In the case where goods are stocked in bulk, the estimation for a stock on hand suffices. However, there may be the case where goods for which a contract has already been made are supplied later than the present point of time. In such a case, the number of goods as contracted is regarded as being a part of the stock on hand under a condition that a true stock on hand is not sold out before the goods as contracted are supplied.

The forecast for the change of sales is made by use of a model pattern of a change of sales, that is, a preliminarily inputted relation between time and the ratio of sales to planned sales in total. The sales change model pattern, the details of which will be explained in later, graphically represents a time-lapsing change of sales (or data concerning sales) for goods. It is difficult to make an accurate forecast by use of an absolute value. However, if a model pattern of a change of sales of certain goods is used, the forecast can be easily and accurately made on the basis of a specific character of sales peculiar to the goods or a sale plan.

The absolute value of sales is determined on the assumption that the results of sales follow the sales change model pattern in the past and also in future. This is based on the concept that since "the results of sales at the present point of time must be ** % of the whole", when and how many will the goods sell can be known by referring to the sales change model pattern. The excess or deficiency of a stock on hand at the present point of time can be estimated by the ratio (in percentage) of the cumulative total of sales upon sellout of the stock on hand to the final cumulative total of sales forecasted by the above-mentioned method. This ratio is called a stock-warning index. Merchandise information is sorted (step 104) and displayed (step 105) in the sequence of the values of stock-warning indexes for various goods from a larger one to a smaller one or from a smaller one to a larger one. Thus, it is possible to issue a warning so that goods especially needing countermeasures for inventory adjustment are preferentially dealt with. If the stock-warning index exceeds 100%, it is indicated that the stock has a tendency to excess (or a disposal is required). On the other hand, if the index is below 100%, it is indicated that the stock has a tendency to deficiency (or an additional supply is required).

Next, explanation will be made to a stock-warning system suitable for fashion goods to which the present invention is applied.

Figure 2:
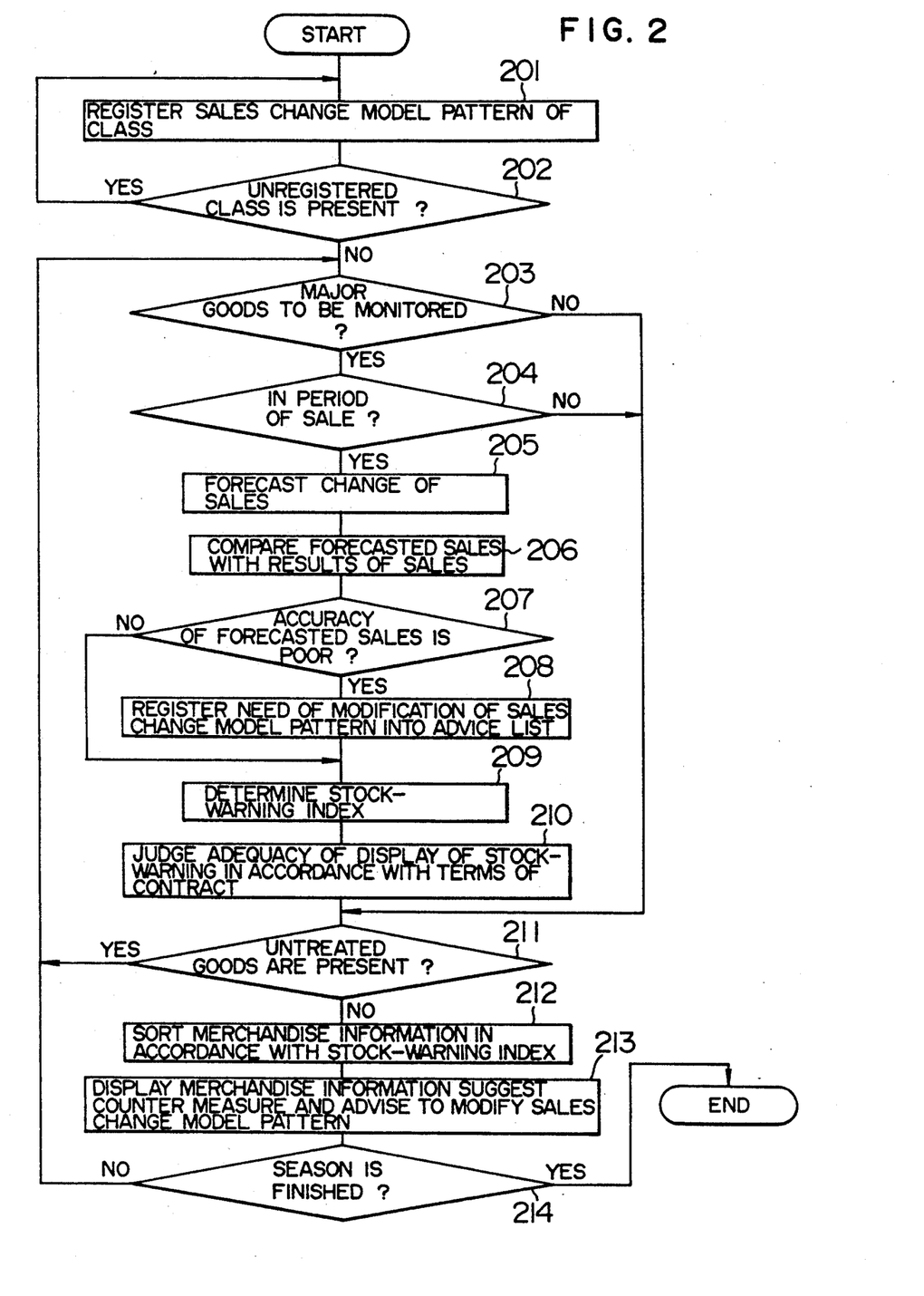
FIG. 2 is the flow chart of a processing performed by a stock-warning system suitable for fashion goods in which the present invention is used.

FIG. 2 is the flow chart of a processing performed by the stock-warning system suitable for fashion goods to which the present invention is applied. In the present system, prior to a sale season, goods are preliminarily grouped into classes each of which may be supposed to exhibit a similar life cycle (or specific character of sale results) and a sales change model pattern (or a model pattern of a life cycle of sales) is registered for every class (steps 201 and 202). During a sale season of goods to be subjected to inventory control (step 211), steps 203 to 213 are repeated every day (step 214).

For goods in a period of sale (step 204), among goods to be monitored (step 203), a change of sales is forecasted by use of a sales change model pattern (step 205) and the degree of excess or deficiency of a stock on hand is determined as a stock-warning index (step 209). The degree of urgency of a countermeasure or an inventory adjustment action (additional order, return, reduction in price, transfer between stores, or the like) and so on are judged in accordance with the value of the stock-warning index and the sequence (or ranking) of display of merchandise information is determined (step 212). In this case, goods impossible of attempt of any countermeasure or under a countermeasure (uncompleted) are excluded judging it as having no need of display thereof on the basis of information concerning the contents of a contract with a maker or wholesaler (step 210) and are to be treated as an exception. Not only the merchandise information but also a way of a countermeasure and the quantity of goods restricted by the contents of the contract are displayed (step 213). The accuracy of forecasted sales is monitored (step 206). If the accuracy of forecasted sales is poor (step 207), a modification of the sales change model pattern for the corresponding goods is judged as being necessary (step 208) and an advice to modify the model pattern is made (step 213).

Figure 3:
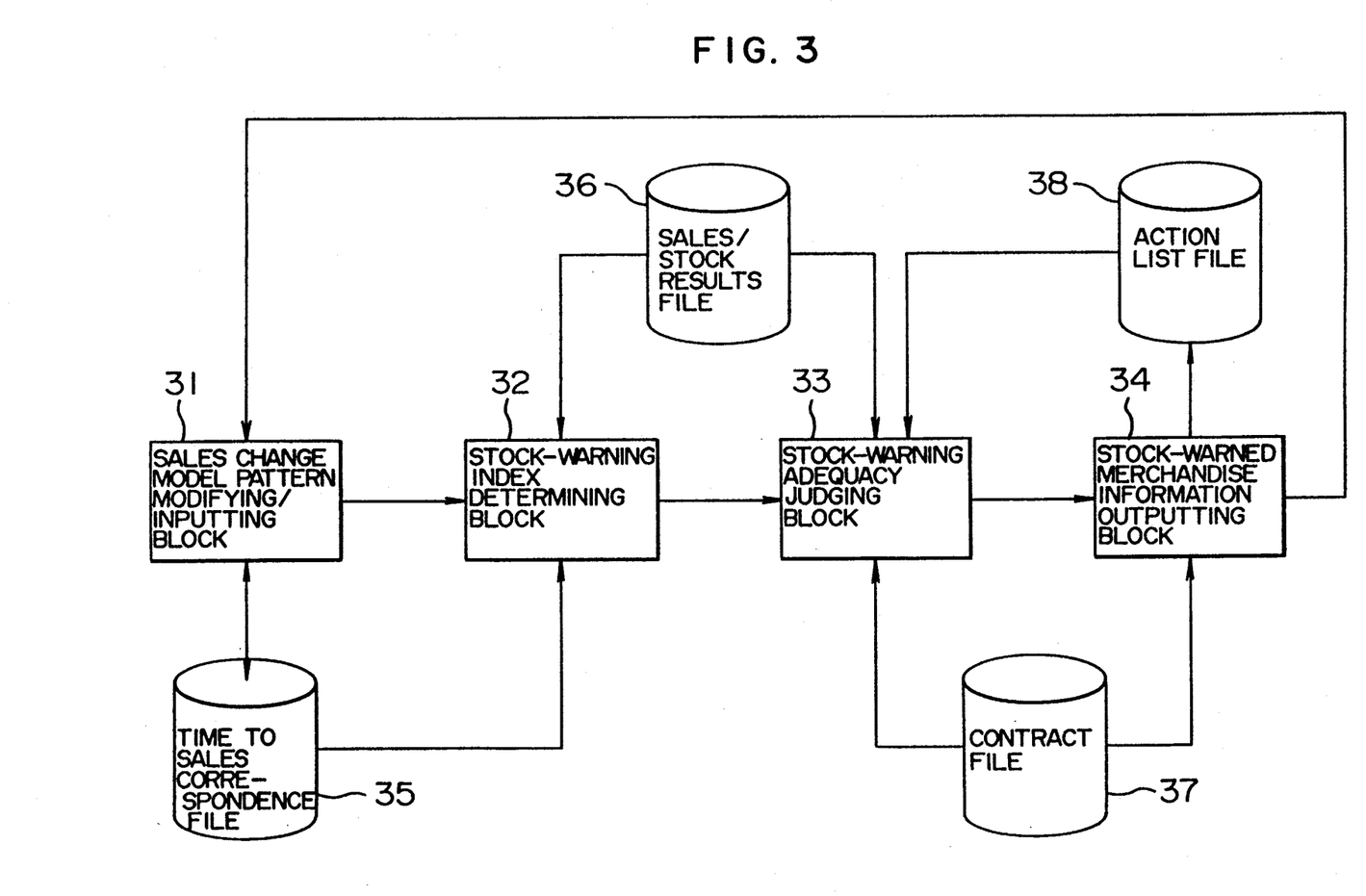
FIG. 3 is a block diagram of the inventive stock-warning system.
Figure 4:
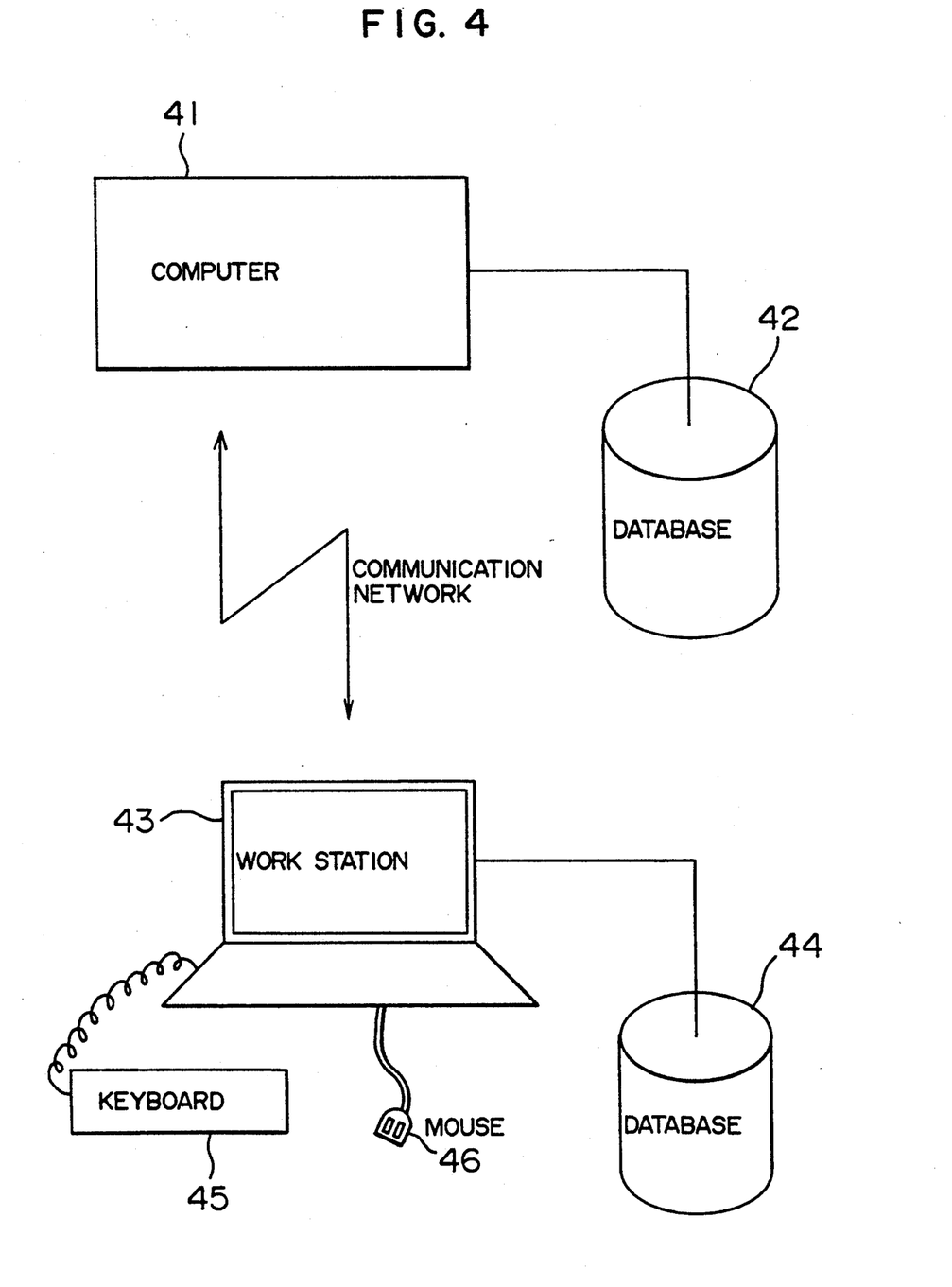
FIG. 4 is a view showing the organization of parts or components for realizing the inventive stock-warning system.

FIG. 3 is a functional block diagram of the inventive system for more plain explanation of the present invention and FIG. 4 is a view showing the organization of parts or components for realizing the system.

The function and operation of each of blocks in the inventive system will now be explained in detail using mainly FIGS. 3 and 4.

(1) Sales Change Model Pattern Modifying/Inputting Block 31

A sales change model pattern modifying/inputting block 31 is a block for performing a processing of converting an inputted sales change model pattern for a certain class of goods into a table (see FIG. 9) showing the correspondence relation between time (date) and the ratio of sales to planned sales in total (with the final cumulative total of planned sales at the end of a period of sale being 100%) and registering it into a time to sales correspondence file 35.

Figure 5:
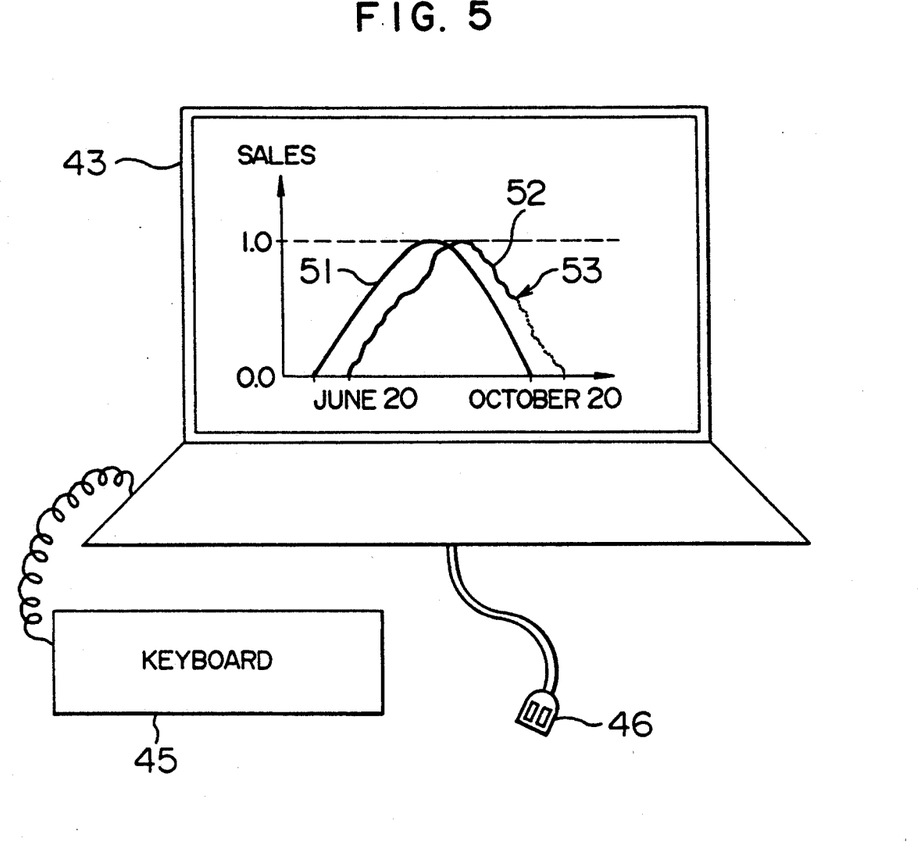
FIG. 5 is a view for explaining a method of inputting a model pattern of a change of sales of goods.
Figure 7:
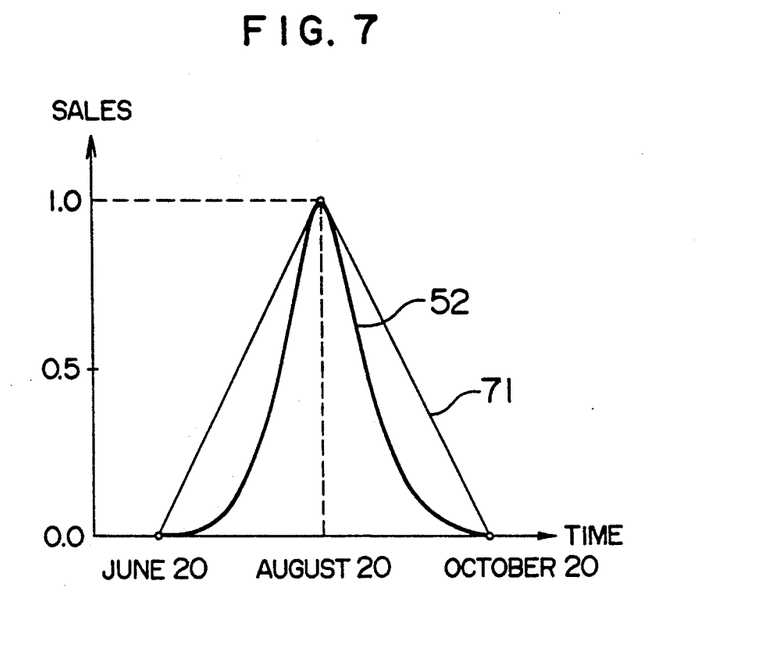
FIG. 7 is a graph showing one example of a model pattern of a change of sales.
Figure 8:
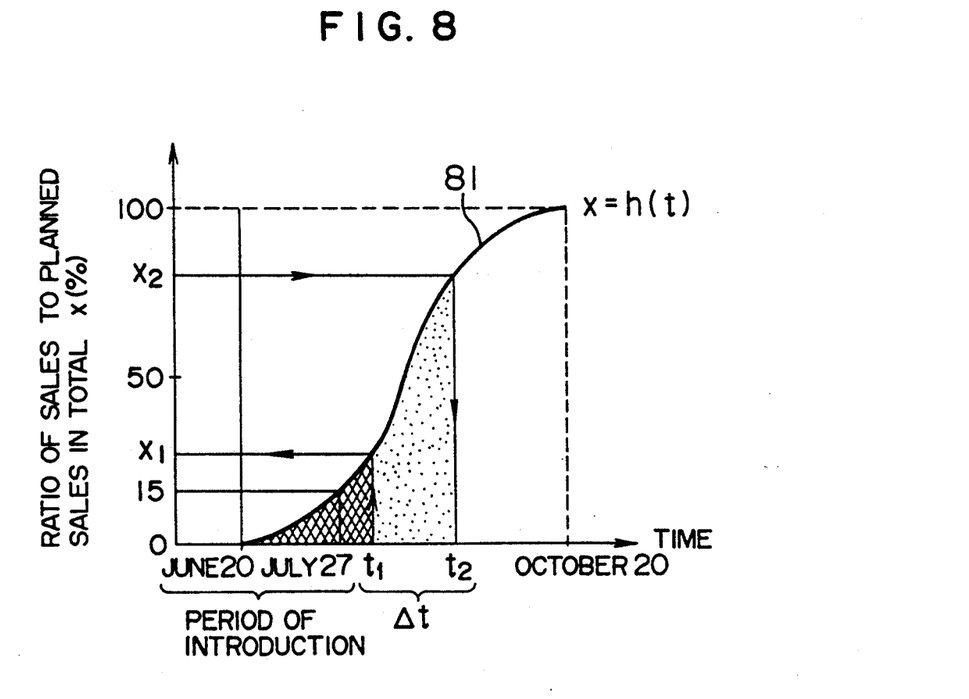
FIG. 8 is a graph showing one example of a relation between time and the ratio of sales to planned sales in total.

FIG. 5 is a view showing a method of inputting the model pattern. First, there is selected a class of goods which may be supposed to exhibit the same or similar sales change pattern as or to a class of goods for which a sales change model pattern in this season of sale is to be inputted. Information concerning the results of sales of the selected class of goods on the preceding year is fetched into a work station 43 from a database 42 connected to a computer 41. In the work station 43, the fetched information is graphed and displayed as reference information 51. A sales change model pattern 52 in this season is inputted with reference to the displayed graph or reference information 51. The inputting of the model pattern 52 is made by moving a cursor 53 (indicated by arrow in FIG. 5) by virtue of a mouse 46 to sketch out the whole of the model pattern. Alternatively, an approximation of the model pattern to a simple triangle 71 (see FIG. 7) is made and the time coordinates of apexes of the triangle (the starting and ending dates of a planned period of sale and the peak date of sales) are inputted from a keyboard 45. The inputted model pattern 52 is converted into a relation 81 of $$x = h(t)$$

between time t and the ratio of sales to planned sales in total x (normalized such that the cumulative total of sales in the aggregate is 1) as shown in FIG. 8. In this case, the relation between time t and the cumulative total of sales y can be represented by $$y = f(t) = k \cdot h(t).$$

Figure 9:
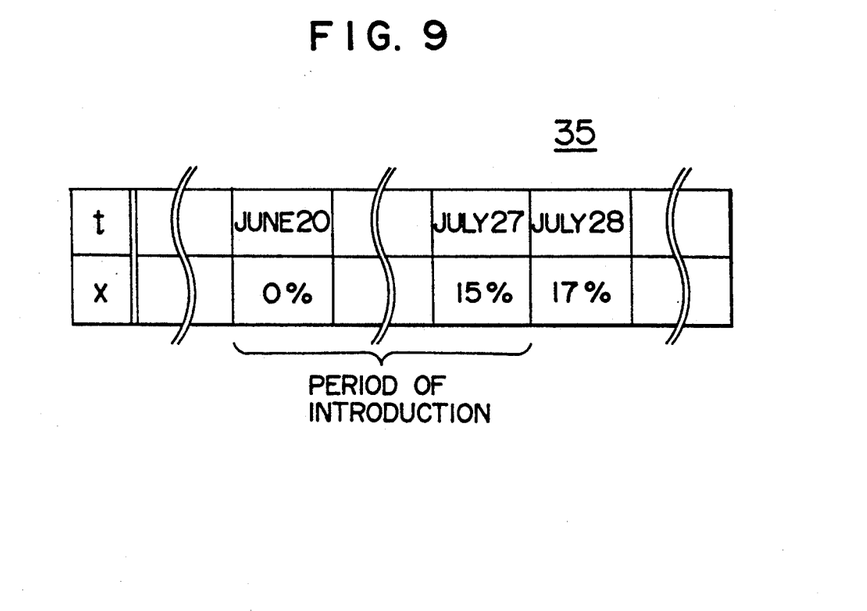
FIG. 9 is a view tabulating a relation between time and the ratio of sales to planned sales in total.

Here, k is a proportional constant. A period from the start of sale until the cumulative total of sales reaches a certain or predetermined level (fro example, 15% of the final cumulative total of sales) is regarded as a period of introduction. The relation 81 is registered as table information in units of dates as shown in FIG. 9 into the time to sales correspondence file 35 for the relation between time (t) and the ratio of sales to planned sales in total (x) which is provided in a database 44.

(2) Stock-Warning Index Determining Block 32

Every day, after the end of business, a stock-warning index is determined by use of the computer 41. It should be noted that the absolute value of sales is forecasted on the assumption that the sales will change along the model pattern. Namely, this is based on the concept that since the results of sales at the present point of time "must be ** % of the sales amount which is to be finally obtained", there can be forecasted the total number of goods which will be finally sold.

Figure 10:
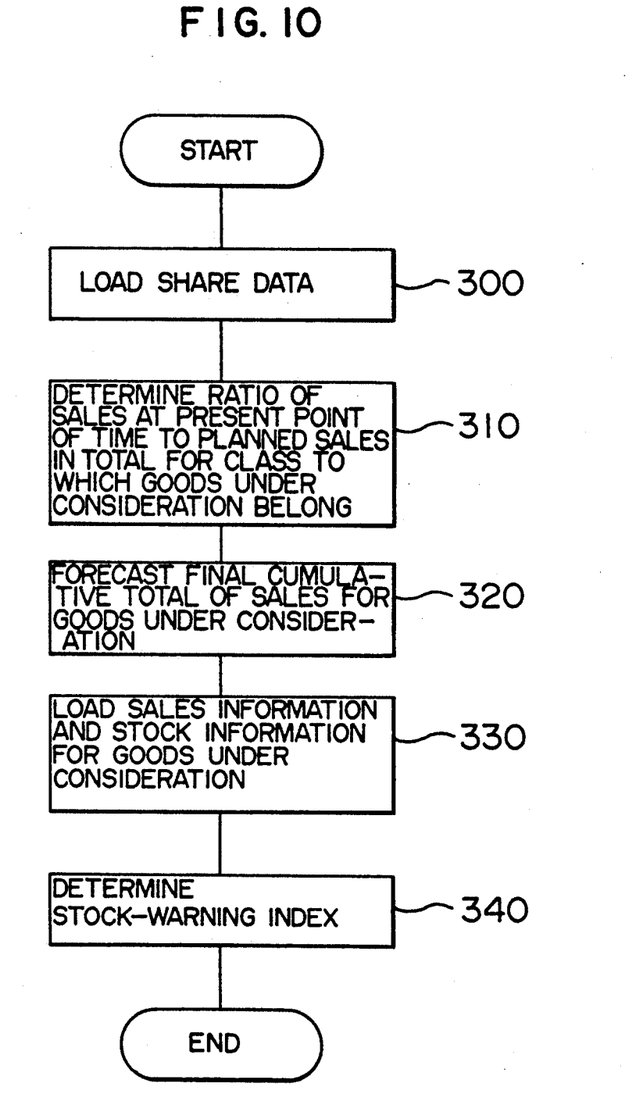
FIG. 10 is the flow chart of a processing for determination of a stock-warning index.

The procedure for determination of the stock-warning index will now be explained by virtue of FIG. 10.

Figure 11:
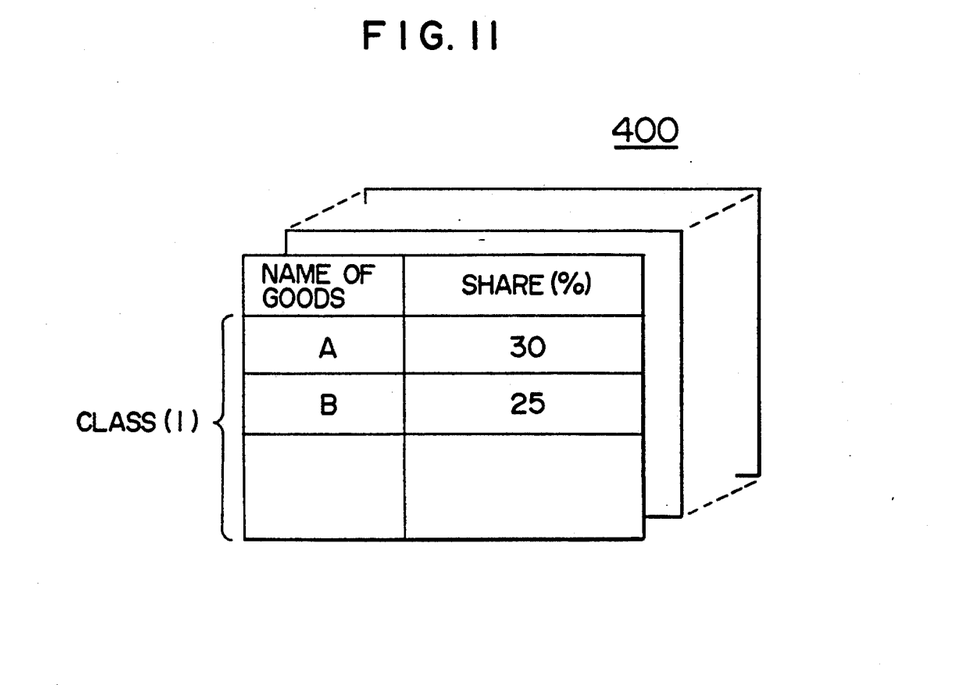
FIG. 11 is a view showing the construction of a share date table.

(a) Data concerning a share of goods to be subjected to determination of a stock-warning index therefor in a class of goods to which the goods under consideration belong, is loaded (step 300). The share is the ratio of the cumulative total of sales of the goods under consideration to the cumulative total of sales of all gods in the class. The share data is stored in a share data table 400 shown in FIG. 11. As is shown, the share data table 400 is constructed in units of classes (or with every class). The share data table 400 is stored in the database 42.

(b) The ratio $h(t_i)$ of sales at the present point of time (for example, instant to $t_i$ in FIG. 8) to planned sales in total for the class is determined from a model pattern 52 (more particularly, such a relation 81 after conversion as shown in FIG. 8) for the class (step 310). Since each class is constructed by goods which exhibit changes of sales similar to each other, a pattern of a change of sales for the class is substantially coincident with a pattern of a change of sales for each of goods which belong to that class.

(c) In step 320, the results of sales $Y_i$ for the class at the present point of time are fetched from a sales/stock results file 36 and the final cumulative total of sales $f(t_n)$ for the goods under consideration at the end $t_n$ of a period of sale (in the case of FIG. 8, October 20) is forecasted by use of a relation of $$f(t_n) = \frac{Y_i \times 100}{h(t_i)} \times \text{(share)}.$$

(d) Sales information $y_i$ and hand-stock information $z_i$ for the goods under consideration at the present point of time are fetched from the sales/stock results file 36 (step 330).

(e) In step 340, the ratio $\gamma$ of the cumulative total upon sellout of $z_i$ to the final cumulative total of sales $f(t_n)$ at the end of the period of sale forecasted in step 320 is determined as $$\gamma(t_i) = \frac{y_i + z_i}{f(t_n)} \times 100(\%)$$

The ratio $\gamma$ is a function of $t_i$ since it depends on the final cumulative total of sales $f(t_n)$ forecasted at the present point of time or $t_i$. The ratio $\gamma(t_i)$ is a stock-warning index. $\gamma(t_i) - 100$ represents the excess amount of stock and $100 - \gamma(t_i)$ represents the deficient amount of stock. Alternatively, an inverse function $t = g(y)$ of the $y = f(t)$ is used to determine a point of time $t_j = g(f(t_i) + z_i)$ when $Z_i$ will be sold out and a spare time or float $\Delta t(t_i) = t_j - t_i$ (corresponding to $t_2 - t_1$ in FIG. 8) until the stock is sold out is used as an index representative of the degree of urgency of an action for inventory adjustment such as an additional order. The index $\gamma(t_i)$ may be called the degree of tolerance while the index $\Delta t$ may be called the degree of urgency. Also, either $\gamma(t_i)$ or $\Delta t$ can be called a stock-warning index. The determination of the index is made in only a period beyond a period of introduction for the goods under consideration until the sale is finished, for example, a period satisfying $h(t_i) \geq 15$ (%). The value (15%) of the right side of the relation for $h(t_i)$ is given as one example. Generally of preferably, it may be 10 to 30%. Thereby, any useless calculation can be omitted and an error in determination of the index can be suppressed.

(3) Stock-Warning Adequacy Judging Block 33

Figure 6:
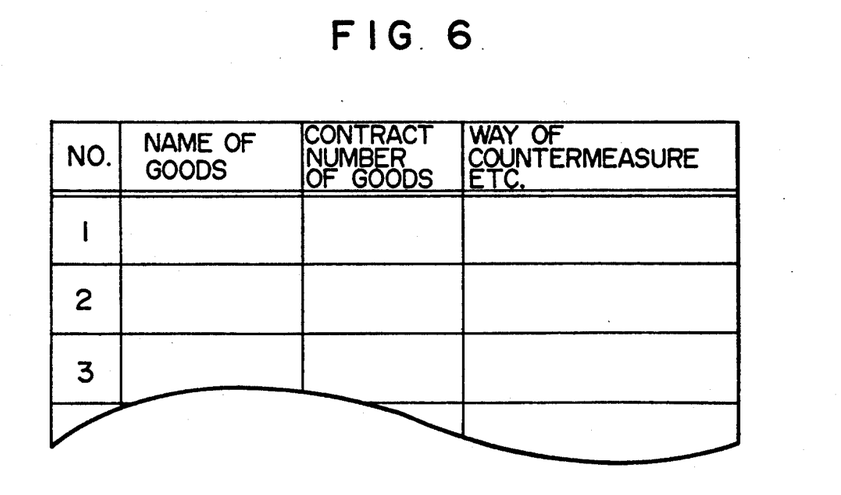
FIG. 6 is a view showing the format of a contract file.
Figure 14:
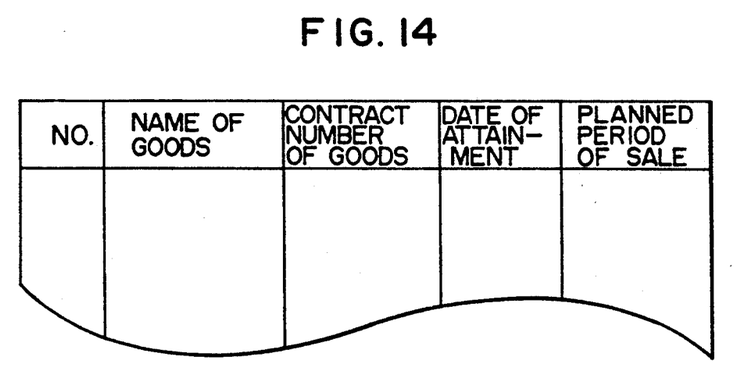
FIG. 14 is a view showing one example of a list of goods for which the contract number has been attained.

A stock-warning adequacy judging block 33 is a block for performing a processing of judging the presence or absence of a need of issuing a stock-warning on the basis of the list of actions taken for inventory adjustment and/or the contents of a contract with a maker or wholesale. The stock-warning issued here is provided for urging an action to be taken for inventory adjustment. Therefore, no warning is issued for goods for which any action for inventory adjustment cannot be taken or goods for which any action for inventory adjustment is not necessary. As for fashion goods, since they are highly risky, a contract concerning the selling (or receiving) number is made between a retail store and a maker or wholesaler. Therefore, there may be the case where an additional order exceeding the contract number of goods is difficult. Even if the additional order of goods is made, days (or a lead time) from the additional order of goods to the supply or delivery thereof is generally long. Accordingly, there may take place the inconvenience that after a stock-warning has been issued once, a similar stock-warning will be continued indefinitely or the inconvenience that though an action for inventory adjustment (or an additional order) has been taken for a stock-warning, a similar stock-warning will be continued so long as goods are not supplied. It is preferable to restrain the issuance of a stock-warning to remove such inconveniences. In order to cope with the former inconvenience, the contract number of goods is fetched from a contract file 37 (see FIG. 6) in the database 42 and when the fetched contract number coincides with the results (or cumulative total) of sales fetched from the sales/stock results file 36, the absence of a need for stock-warning is determined since an action for inventory adjustment or an additional order is impossible. In order to cope with the latter inconvenience, the ordering date, lead time (supply period) and ordering number for the additional order are fetched from an action list file 38 in the database 44 and if there is no problem, the absence of a need for stock-warning is determined. If there is a problem (for example, a further additional order is required or no goods are supplied notwithstanding that the lead time (supply period) has lapsed), a determination is made to issue a warning indicative of the presence of the problem or a need for inventory adjustment. It should be noted that goods judged as having no need for stock-warning should be treated as an exception or the merchandise information should be organized (or arranged in order) for every reason of no need for stock-warning (see FIG. 14).

(4) Stock-Warned Merchandise Information Outputting Block 34

Figure 12:
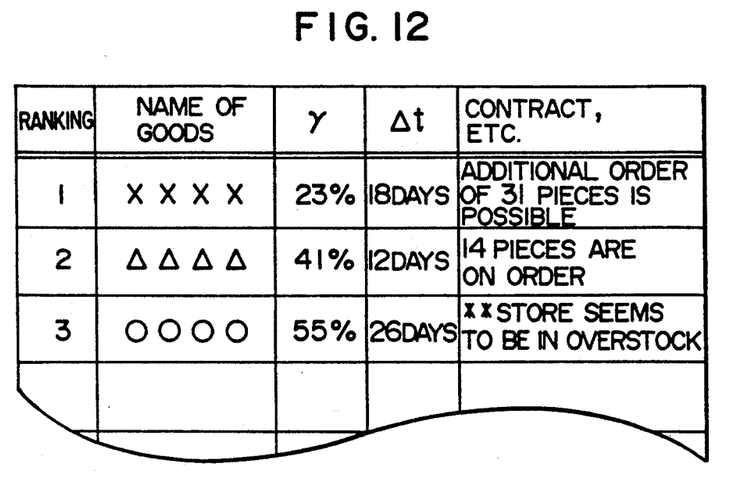
FIG. 12 is a view showing one example of an output list in which merchandise information is sorted in accordance with stock-warning indexes.

A stock-warned merchandise information outputting block 34 is a block for performing a processing of outputting the list of all goods other than goods judged as having no need for stock-warning after sorting them in accordance with the value of the stock-warning index $\gamma$. To provide stock-excess information, the stock-warning indexes $\gamma$ are arranged in a sequence from a larger one to a smaller one. To provide stock-deficiency information, the stock-warning indexes $\gamma$ are arranged in a sequence from a smaller one to a larger one. This sequence also represents the degree of necessity for an action to be taken for inventory adjustment. FIG. 12 shows one example of an output list. If the contents of a contract are additionally displayed as reference information upon stock-warning, the efficiency of inventory control operation of a person in charge can be improved. In the case where an action for inventory adjustment is taken for stock-warned goods, this fact is registered into the action list file 38. If the action is one giving an influence on the sales of goods, for example, the reduction in price, there returns to the processing in the sales change model pattern modifying/inputting block 31 to modify the sales change model pattern. Also, whether or not a difference between the forecast and the results is large and shows a magnifying tendency, is monitored to issue a warning for modification of the model pattern for the corresponding goods.

Figure 13:
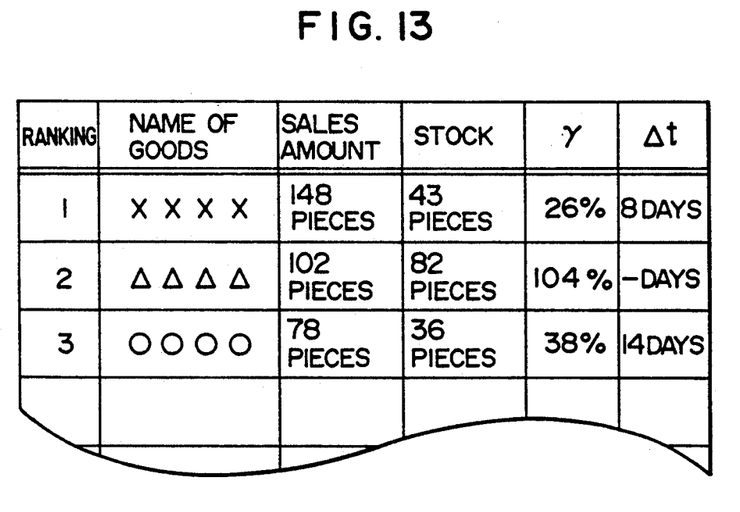
FIG. 13 is a view showing one example of an output list in which merchandise information is sorted in accordance with the sequence of sales amounts and stock-warning indexes are given additionally or as reference information.

Goods to be stock-warned may be restricted to only good/poor sellers (see FIG. 13). A judgement for this purpose is made using best/worst sales information as it is. Alternatively, common characters may be extracted from higher/lower sales goods (seller analysis) to grasp a seller. Also, goods to be watched may be limited in units of brands or coordinates. In this manner, selective or priority work for inventory control (action to be taken for inventory adjustment) is suggested, thereby making it possible to reduce the quantity of work to be treated.

According to the present invention, since it is possible to support the analysis of complicated information and the decision making for inventory adjustment actions by a person in charge of inventory control which have hitherto been required in an inventory control of fashion goods having different changes of sales, there are provided effects that the work of the person in charge can be greatly reduced and a necessary action can be taken in time, thereby reducing the loss of a chance for sale which may be caused by absence of stock, deficiency of stock, or the like and increasing the sales and profits.

What is claimed is:

1. An inventory control method comprising computer aided steps of:
   forecasting a cumulative total of sales for goods by using a result of sales from other goods which are selected and inputted with the use of an interactive graphics system, which may exhibit a similar sales change pattern to the goods;
   obtaining a sum of an actual result of sales and an actual stock for the goods;
   comparing the sum with the forecasted cumulative total of sales for the goods by displaying the forecasted information on a graph as reference information and comparing the reference information to actual inventory information;
   determining an excess or deficiency of the actual stock for the goods on the basis of the graphic comparing;
   outputting information of the goods corresponding to the determined excess or deficiency of the actual stock inventory for the goods, wherein said outputted information is in the form of a percent ratio and is labeled, the stock warning index, to provide the necessary level of priority and degree of urgency corresponding to the goods; and,
   adjusting the actual stock inventory in accordance with the outputted information.

2. The inventory control method according to claim 1, wherein the result of sales from the other goods is used as a sales change model pattern, and further including creating a whole model pattern by using an interactive graphics system.

3. An inventory control system comprising:
   a means for forecasting a cumulative total of sales for goods by using a result of sales stored in a database for other goods which may exhibit a similar sales change pattern to the goods;
   a means for obtaining a sum of an actual result of sales and an actual stock for the goods stored in a sales/stock results file;
   a means for interactively and graphically comparing the obtained sum with the forecasted cumulative total of sales for the goods;
   a means for determining an excess or deficiency of the actual stock inventory for the goods on the basis of a result from the comparing means;
   a means for outputting information comprising a stock warning index, which prioritizes an urgency of adjusting the actual stock inventory resulting from the determined excess or deficiency of the actual stock inventory for the goods; and,
   a means for adjusting the actual stock inventory in accordance with the stock warning index.

4. The inventory control system according to claim 3, wherein in the means for forecasting the result of sales for the other goods stored in the sales/stock results file, is used as a sales change model pattern.

5. An inventory control system comprising:
   a means for forecasting a change in sales for goods that are subject to inventory control, by using a model pattern of a predetermined change of sales for the goods stored in a time-to-sales-correspondence file;
   a means for monitoring a difference between the forecasted change in sales for the goods and an actual change in sales for the goods stored in a sales/stock results including means for daily monitoring by calculation of a stock warning index;
   a means for outputting the stock warning index for allowing modification of the model pattern if the monitored difference is larger than a predetermined level; and,
   a means for adjusting actual stock inventory in accordance with said outputted stock warning index.

6. The inventory control system according to claim 5, wherein the forecasting means is operated before the goods are on sale.

* * * * *